(12) United States Patent
Saint Etienne et al.

(10) Patent No.: US 7,352,744 B2
(45) Date of Patent: *Apr. 1, 2008

(54) SWITCHED FULL-DUPLEX ETHERNET TYPE COMMUNICATION NETWORK AND IMPLEMENTATION PROCESS FOR THIS NETWORK

(75) Inventors: Jean-Francois Saint Etienne, Cugnaux (FR); Juan Lopez, Toulouse (FR); Dominique Portes, Auzeville-Tolosane (FR); Eddie Gambardella, Blagnac (FR); Bruno Pasquier, Thil (FR); Philippe Almeida, Cugnaux (FR)

(73) Assignee: Airbus France S.A.S., Toulouse (FR)

( * ) Notice: Subject to any disclaimer, the term of this patent is extended or adjusted under 35 U.S.C. 154(b) by 876 days.

This patent is subject to a terminal disclaimer.

(21) Appl. No.: 10/717,549

(22) Filed: Nov. 21, 2003

(65) Prior Publication Data

US 2004/0218554 A1 Nov. 4, 2004

Related U.S. Application Data

(63) Continuation of application No. 10/287,912, filed on Nov. 4, 2002.

(30) Foreign Application Priority Data

Nov. 5, 2001 (FR) .................................. 01 14263

(51) Int. Cl.
*H04L 12/28* (2006.01)

(52) U.S. Cl. ....................... 370/389; 370/535; 370/537

(58) Field of Classification Search ................ 370/389, 370/221, 224, 228; 714/4, 6, 11, 717
See application file for complete search history.

(56) References Cited

U.S. PATENT DOCUMENTS

| | | | | |
|---|---|---|---|---|
| 4,780,869 | A * | 10/1988 | Engdahl et al. .............. | 370/228 |
| 5,379,278 | A * | 1/1995 | Safadi ........................ | 370/221 |
| 6,188,689 | B1* | 2/2001 | Katsube et al. ............. | 370/389 |
| 6,282,669 | B1* | 8/2001 | Imanaka et al. ................ | 714/4 |
| 6,615,271 | B1* | 9/2003 | Lauck et al. ................. | 709/232 |
| 6,721,273 | B1* | 4/2004 | Lyon .......................... | 370/235 |
| 6,766,482 | B1* | 7/2004 | Yip et al. .................... | 714/717 |
| 2002/0090946 | A1* | 7/2002 | Mielke et al. .............. | 455/435 |
| 2003/0152077 | A1 | 8/2003 | Saint Etienne et al. | |
| 2006/0107108 | A1* | 5/2006 | Geng et al. .................... | 714/11 |

* cited by examiner

*Primary Examiner*—Chi Pham
*Assistant Examiner*—Albert T. Chou
(74) *Attorney, Agent, or Firm*—Oblon, Spivak, McClelland, Maier & Neustadt, P.C.

(57) ABSTRACT

A switched full-duplex Ethernet type communication network including at least one source subscriber equipment and at least one destination subscriber equipment connected to each other through at least one physical link through at least one switch and at least one virtual link, which is the conceptual representation of a link from a source equipment to at least one destination equipment. Each equipment transmitting Ethernet frames segregates between virtual links and allocation of a passband for each virtual link and multiplexes virtual links on the physical link output from this equipment. Each transmitted frame has a field that identifies the virtual link to which it belongs.

8 Claims, 5 Drawing Sheets

SWITCHED FULL-DUPLEX ETHERNET TYPE COMMUNICATION NETWORK AND IMPLEMENTATION PROCESS FOR THIS NETWORK

CROSS REFERENCE TO RELATED APPLICATIONS

The present patent document is a continuation of U.S. application Ser. No. 10/287,912 filed on Nov. 4, 2002, and claims priority to French patent application FR 01 14263 filed Nov. 5, 2001, the entire contents of each of which are hereby incorporated herein by reference.

BACKGROUND OF THE INVENTION

1. Field of the Invention

This invention relates to a switched full-duplex Ethernet type communication network, particularly in avionics.

2. Description of the Related Art

The Ethernet network, which is the reference in the world of communication networks, can be used to send data in digital form by packets or "frames", where a packet is defined as being a set of data sent in a single step on the network.

In an Ethernet network, the data in each packet are not interpreted. The network carries the data without understanding their meaning. A packet is composed of two types of data, network data that are used to route the packet to its correct destination, and useful data which comprise the "useful load" in the packet.

An Ethernet network is composed of different equipment that is subscribed to the network, and connected to each other through a communication means formed of active equipment called switches, which perform three functions:

connect network subscribers in point to point mode through physical links, which are physical supports for messages to be transferred, for example twisted pair cables, route (switch) packets sent by source equipment to one or more destination equipment, check the integrity and the format of the Ethernet packet.

Figure 1:
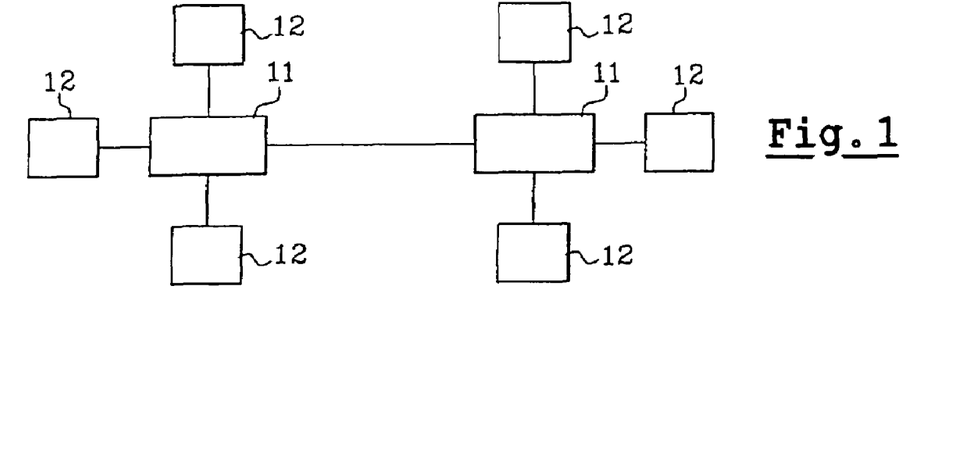
FIG. 1 illustrates an Ethernet network according to known art.

FIG. 1 illustrates an Ethernet network composed of two switches 11 interconnected to each other and each connected to three items of subscriber equipment 12 in point to point mode.

Operation of such a network is simple. Each network subscriber can send packets in digital form at any time towards one or several other subscribers. When a switch receives the packets, the "network information" data are analyzed to determine the destination equipment. The packets are then switched towards this equipment.

In the "switched full-duplex Ethernet type network" expression:

the "full-duplex" term means that the subscriber can send and receive packets at the same time on the same link, the "switched" term means that the packets are switched in switches on appropriate outputs.

For example, this network may be a 100 Mbits/s switched full-duplex type network on twisted pair; the term "twisted pair" means that connections between the equipment and the switches are composed of two pairs of cables, each pair being twisted; the term 100 Mbits/s simply means the transmission or reception speed of packets on the network.

The Ethernet technology imposes:

a minimum size and a maximum size on the packets, an identification of the source and/or the destination(s) in each packet, a CRC ("Cyclic Redundancy Check") that checks the integrity of the transported data.

At the present time, in the civil aeronautics field, data exchanges between the various onboard computers are based on the use of the ARINC 429 aeronautical standard.

However, the switched full-duplex Ethernet network is frequently used in industry. The emergence of new communication technologies shows that this type of network is an open and standard solution (IEEE standard 802.3) with a considerable potential for development as a local network. But this type of solution does not provide any means of guaranteeing segregation and transfer performances (in terms of network access, latency, etc.) necessary for avionics applications.

SUMMARY OF THE INVENTION

The purpose of this invention is to propose a switched full-duplex Ethernet type network, which guarantees data segregation and a limit to data transfer time, to enable application in avionics.

The invention relates to a switched full-duplex Ethernet type network comprising at least one source subscriber equipment and at least one destination subscriber equipment connected to each other through at least one physical link through at least one switch and through at least one virtual link which is the conceptual representation of a link from a source equipment to at least one destination equipment, characterised in that each source equipment transmitting Ethernet frames comprises:

means of segregation between virtual links and allocation of a passband for each virtual link, means of multiplexing virtual links on the physical link output from this equipment, each transmitted frame having a field that identifies the virtual link to which it belongs.

Advantageously, each destination equipment comprises means of subscribing to at least one virtual link in reception and achieving segregation between virtual links as far as the application.

Advantageously, each switch comprises incoming passband control means for each virtual link. It uses a static configuration table to know which virtual links it needs to switch, and the allowable number of packets for a virtual link. It comprises:

means of separately configuring each input port in order to indicate the output ports towards which each received Ethernet frame must be directed as a function of the virtual link identifier, means of monitoring the flow of Ethernet frames associated with each virtual link that passes through the switch, means of reformatting the flow in each virtual link, means of multiplexing flows in virtual links on each output port.

In one example embodiment, each switch comprises the following in sequence:

an input port, flow control means, a switching motor supporting multidestination transfers, flow control means, flow reformatting means,
virtual link multiplexing means,
an output port.

Advantageously, a virtual link is characterized by:
- a transfer direction, the virtual link being single directional,
- a single transmitter subscriber: in this case the equipment,
- one or several subscribers in reception: in this case the equipment,
- a fixed passband (maximum number of packets per second and their size),
- a maximum guaranteed time for transfer of packets from a source equipment to a destination equipment, regardless of the behaviour of the rest of the network, each virtual link having its own transfer time,
- a path fixed on the network,
- an unique identifier.

In one advantageous embodiment, network redundancy is achieved by doubling up the network, each subscriber having a connection to each of the two networks.

The invention also relates to a process for implementation of a switched full-duplex Ethernet type communication network comprising source and destination subscriber equipment connected to each other through at least one physical link through at least one switch and through at least one virtual link that is the conceptual representation of a link from a source equipment to at least one destination equipment, characterized in that in a transmission service, an application is allowed to access virtual links in transmission, this service being used to multiplex virtual links to the physical link through an Ethernet interface, and to send packets for each virtual link as a function of the passband allocated to the virtual link. In a reception service, the packets are decoded, it is checked that their format is correct and useful data are made available to applications. In a passband protection service in the switch, the time characteristics of the packets are checked for each incoming virtual link, and if the allowable characteristics are exceeded, packets are destroyed to prevent a failure at a transmitter or a virtual link from compromising traffic in other virtual links output from this switch.

Advantageously, in one network redundancy service at subscriber level, a packet is sent and received in two virtual links in order to set up network redundancy, duplication of the network that is transparent for applications to guard against a failure in a switch or an interface.

Advantageously, in a "sampling" service, the destination terminal only presents the last received value to the user, and in this service the last value is systematically overwritten by the new received packet. In a "queuing" service, the destination equipment presents all data that it receives to the user, this service making it possible to:
- send information that the addressee does not want to lose,
- send data larger than the maximum packet size on the virtual link, the transmission service then breaking this data down into packets, and the reception service putting the data together again to make them available to the receiving application.

In a "file transfer" service, a data file is transferred and the transmission service breaks this file down into packets which are then transmitted sequentially, and the reception service recreates this file.

Advantageously, a passband and an inter-packet time are assigned for each virtual link.

In one advantageous embodiment, a subscriber in reception refines the selection of packets on the same virtual link using the network addressing information contained in the packet.

Advantageously, data integrity is achieved on each packet by a CRC that carries out a calculation to validate data transmitted in the packet, each packet is verified at each equipment entry on the network, and every bad packet is destroyed so that it is not used in order to release the passband and thus avoid uselessly creating congestion at the switches.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 4A shows the composition of a transmission equipment.

DETAILED DESCRIPTION OF THE PREFERRED EMBODIMENTS

The switched full-duplex Ethernet network according to the invention uses the virtual link concept to limit the end to end transfer time, in other words from a source equipment to one (or several items of) destination equipment.

Concept of Virtual Link

Figure 2:
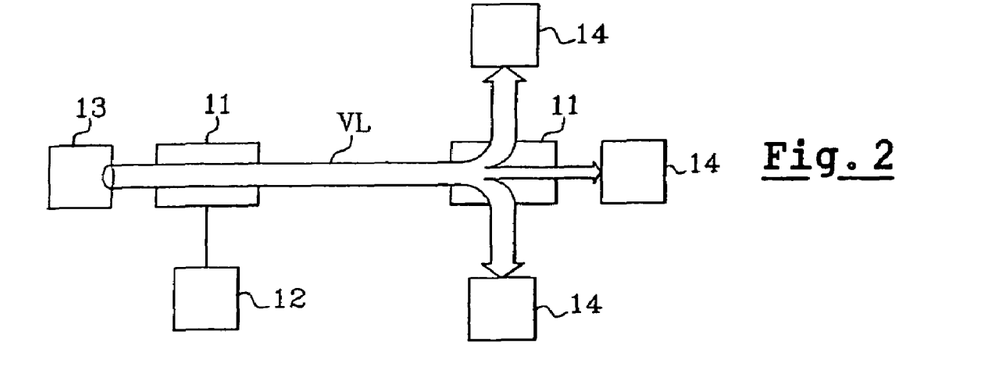
FIG. 2 illustrates the concept of a virtual link in an Ethernet network according to the invention.

This virtual link (VL) concept provides means of isolating data transfers between a source equipment 13 and destination equipment 14. A virtual link VL is seen as a "pipe" on the network, as illustrated in FIG. 2.

A virtual link VL is characterized by:
- a transfer direction, the virtual link being single directional,
- a single source equipment 13,
- one (or several items of) destination equipment 14, a fixed passband (maximum number of packets and their size per second), a maximum guaranteed time for transfer of packets from a source equipment 13 to a destination equipment 14, regardless of the behavior of the rest of the network, each virtual link having its own transfer time, a path fixed on the network, an unique identifier.

Figure 3:
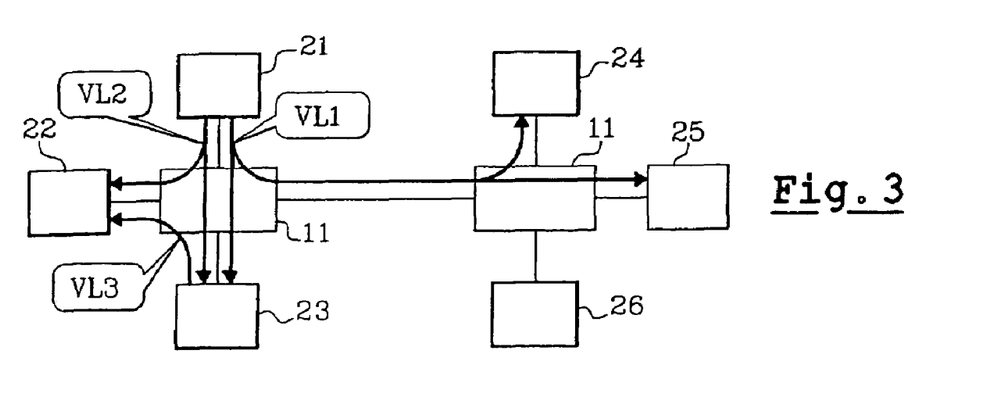
FIG. 3 illustrates an Ethernet network in which several virtual links according to the invention are shown.

A network subscriber may comprise several virtual links VL1, VL2, VL3, as shown in FIG. 3. We have:

a virtual link VL1 from equipment 21 to equipment 23, 24 and 25, a virtual link VL2 from equipment 21 to equipment 22 and 23, a virtual link VL3 from equipment 23 to equipment 22, When equipment 21 wants to send a packet to equipment 23, 24 and 25, it sends a packet on the virtual link VL1. When it wants to send a packet to equipment 22 and 23, it sends a packet on the virtual link VL2.

The difference between virtual links VL1 and VL2 is identified by the destination identifier in the packet. On the network, the virtual link to which a packet belongs is determined by the identifier of the virtual link in the packet.

A switch uses a static configuration table to determine the virtual links that it is required to switch, and the allowable number of packets for a virtual link.

The virtual link concept is a means of fixing communications between equipment by configuring routes and passbands allocated to the virtual links. Thus, the flow formed by a virtual link is sure to be not disturbed by other flows sharing the same physical links all along its route in the network.

Furthermore, the virtual link concept enables central flow management, to make sure that the sum of the passbands allocated to virtual links on the same physical link does not exceed the capacities of the technology of this physical link. In the above example, the sum of the passbands of virtual links VL1 and VL2 must be less than the transmission capacity of the physical link from equipment 21.

Figure 4A:
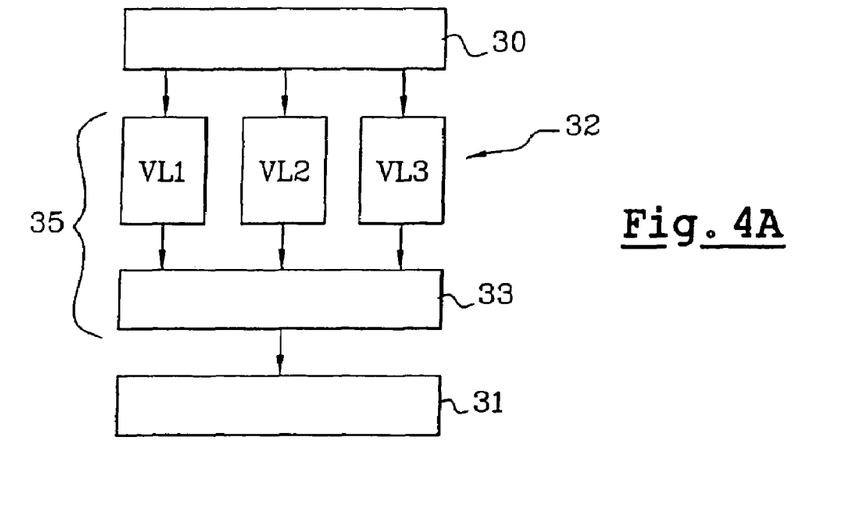
Figure 4B:
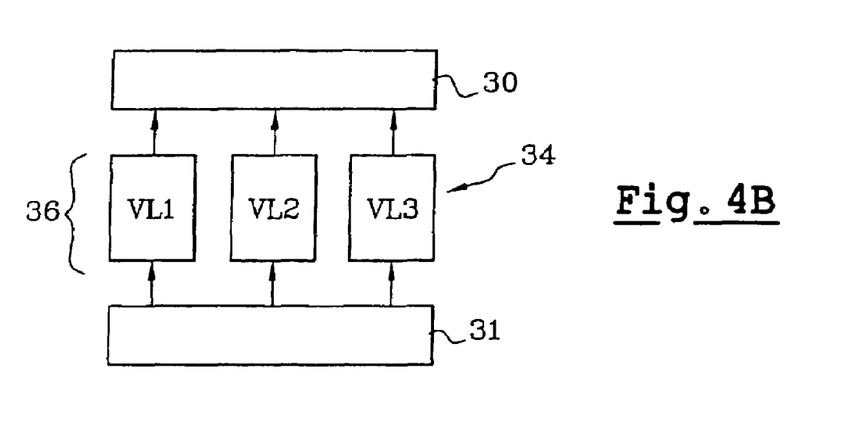
FIG. 4B shows the composition of a reception equipment, for the network according to the invention.

In the network according to the invention, each equipment comprises:

means 32 that define virtual links in transmission and that allocate passbands by controlling segregations, means 33 that sequence accesses of virtual links to the physical link, in transmission, means 34 that make it possible to subscribe to one or several virtual links in reception, and that enable segregation between virtual links as far as the application.

FIGS. 4A and 4B represent these means in transmission and in reception respectively, between an application 30 and a physical layer Ethernet controller 31; the complete assembly of means 32 and 33 forming a communication stack 35 and the means 34 forming a communication stack 36.

Figure 5:
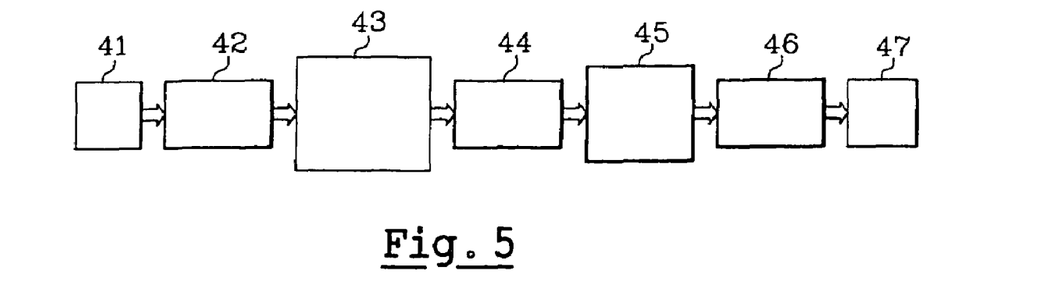
FIG. 5 illustrates the different component elements of a switch in the network according to the invention.

In the network according to the invention, each switch comprises:

means of separately configuring each input port in order to indicate the output ports towards which each received Ethernet frame must be directed as a function of the virtual link identifier, means of monitoring the flow of Ethernet frames associated with each virtual link that passes through the switch, means of reformatting the flow in each virtual link (re-separation of frames for each virtual link), means of multiplexing flows in virtual links on each output port.

Therefore as illustrated in FIG. 5, this switch includes the following in sequence:

an input port 41, flow control means 42, a switching motor supporting multidestination transfers 43, flow control means 44, flow reformatting means 45, means of multiplexing the virtual links 46, an output port 47.

Figure 6:
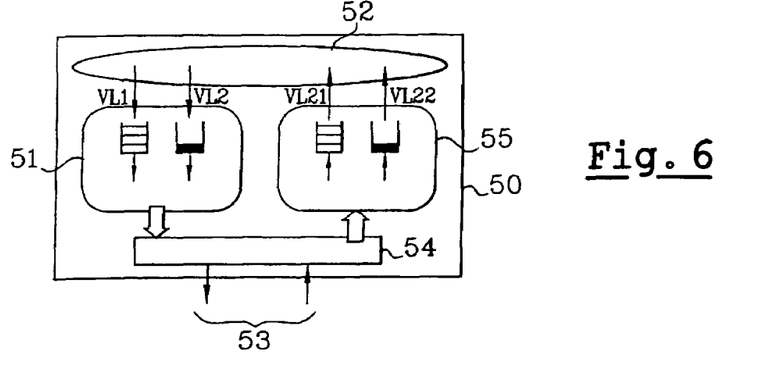
FIGS. 6 and 7 illustrate different services used in the network according to the invention.

Thus, as illustrated in FIG. 6, the network according to the invention is characterized by the implementation of several services or means in each of the subscriber equipment 50:

a transmission service, the role of which is to enable an application 52 to access virtual links in transmission. This service multiplexes virtual links to the physical link 53 through an Ethernet interface 54, and for each virtual link sends packet as a function of the passband allocated to the virtual link.

A reception service 55 that decodes the packets, verifies that their format is good and makes useful data available to applications.

In these transmission and reception services, the virtual link may be represented as being a queue, as seen by the application.

Other protection services are used to guard against some network failures:

A passband protection service in the switch, which verifies the time characteristics of packets (separation between packets, the consumed passband), for each incoming virtual link. If the allowable characteristics are exceeded, the packets will simply be destroyed to prevent a failure in a transmitter or a virtual link from compromising traffic in other virtual links starting from this switch.

Figure 7:
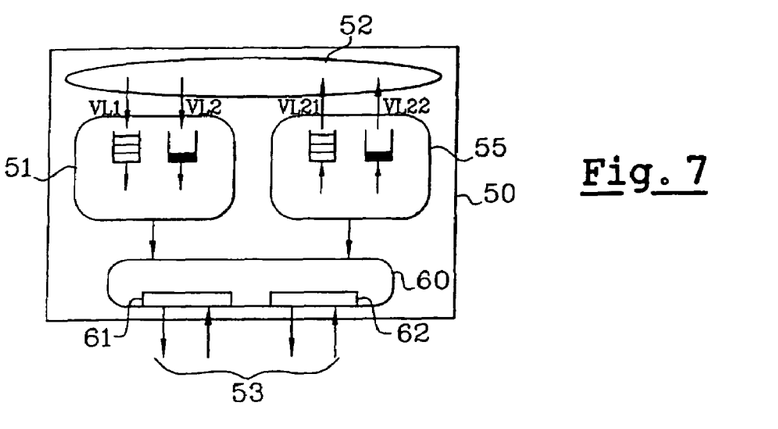

A network redundancy service 60 at subscriber level, that enables transmission and reception of a packet on two virtual links in order to implement a network redundancy. Duplication of the network, which is transparent for applications, thus provides protection against a failure in a switch or an interface (but it does not replace redundancy at system level). As shown in FIG. 7, there are also the transmission and reception services 51 and 55 in FIG. 6, and a network transmission reception redundancy service 60 to which is connected to a first Ethernet interface 61 and to a second Ethernet interface 62.

Transmission and Reception Modes

The communication interface may supply three additional services to subscriber level applications:

"Sampling": the destination equipment only presents the last received value to the user. In reception, the last value is systematically overwritten by the new received packet. This service is suitable for receiving periodic information.

"Queuing": destination equipment presents all data that it receives to the user, even if the receiver does not read them quickly enough. This service is useful for:

sending information that the addressee does not want to lose (all packets will be read), sending data larger than the maximum size of the packet on the virtual link. The transmission service then breaks these data down into packets. The reception service reformats the data to make them available to the receiving application.

"File transfer": this service transfers a data file.

The transmission service breaks it down into packets which are then transmitted sequentially. The reception service reconstructs the file. It is also capable of restarting on error (for example in the case of a data download).

Figure 8:
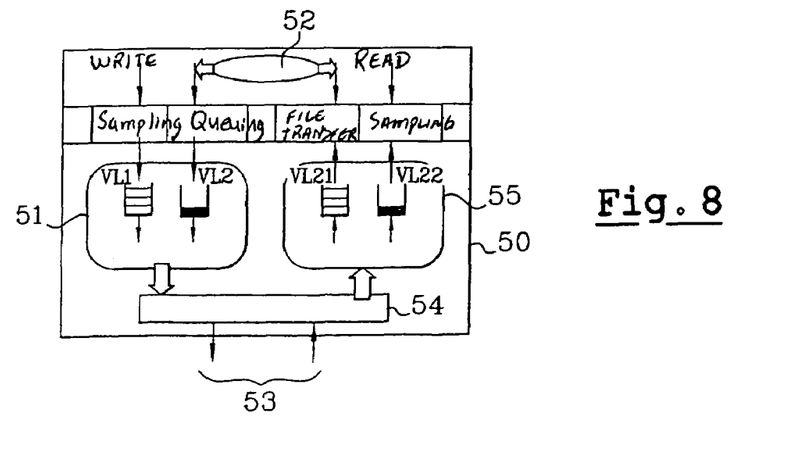
FIG. 8 illustrates the location of "sampling", "queuing" and "file transfer" services with respect to the application and virtual link services as illustrated in FIGS. 6 and 7, in the network according to the invention.

FIG. 8 illustrates the location of these services with respect to applications and services on virtual links, using the same references as in FIG. 6.

Transmission of Packets on a Virtual Link

The invention does not only relate to the definition of virtual links that are used in equipment to send and receive data. It also relates to a particular use of the allocated passband, and sub-filtering functions on reception in a virtual link.

1) The Allocated Passband and Inter-packet Time

The allocated passband is defined as being the number of packets sent per second and the size of each packet. But this definition is incomplete because a passband does not give the distribution of these packets in time. It is also necessary to specify the minimum time to be respected between two packets. This minimum inter-packet time (IPT) gives the maximum passband of the virtual link for a given packet size.

Figure 9:
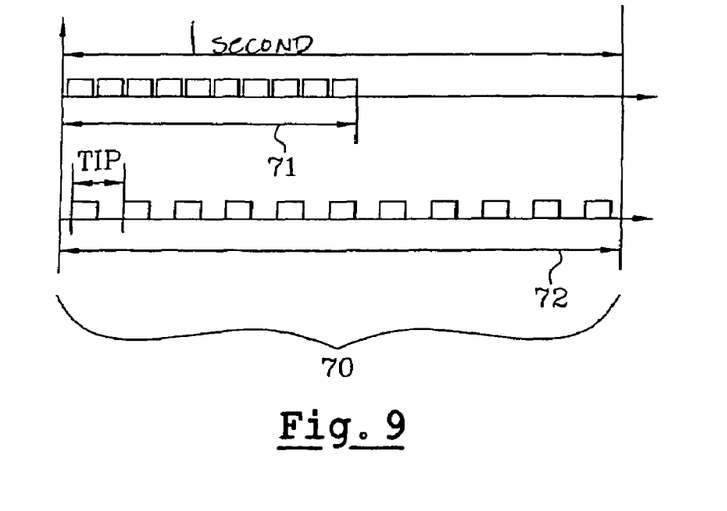
FIG. 9 illustrates two examples of packet distributions in a sequence.

FIG. 9 thus illustrates two example packet distributions in a sequence 70:
- a distribution 71 of 10 packets separated by 1 bit,
- a uniform distribution 72 of 10 packets. The fact of indicating that the minimum inter-packet time is 100 ms gives the maximum traffic envelope on this virtual link, and the passband can be deduced from the packet size using the following formula:

$$\frac{\text{Packet Size}}{\text{Minimum inter-packet time}} = \text{passband of virtual link}$$

The assignment of a passband (PB) and an inter-packet time (IPT) for a virtual link does not mean that the packets will systematically be transmitted on the virtual link every IPT and occupy the entire allocated passband. These packets will only be sent on the virtual link when a subscriber application makes them available to the transmission in this virtual link.

2) The Filter Function in a Virtual Link in Reception

On the same virtual link, a subscriber in reception can refine the selection of packets using network addressing information contained in the packet. This filter mode which uses a virtual sub-links concept gives greater flexibility for the definition and use of virtual links by avoiding the creation of specific virtual links.

Figure 10:
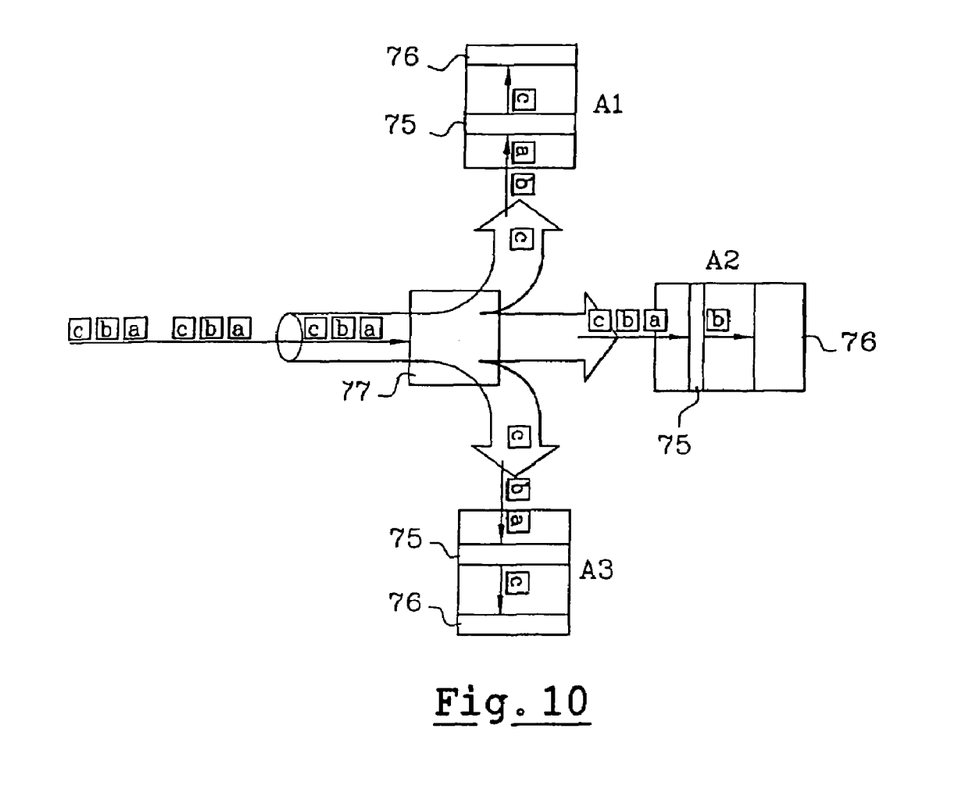
FIG. 10 illustrates the filtering function in a virtual link in reception according to the invention.

FIG. 10 gives an example of a virtual link that supports a stream of three types of packets (a, b and c). Each subscriber can filter (75) the packets according to its needs (subscriber A1-packet a; subscriber A2-packet b; and subscriber A3-packet C).

Performances of the Network According to the Invention

The performances of the network according to the invention can be broken down in four ways:
- data integrity,
- network availability,
- network determinism,
- end to end routing of data.

1) Data Integrity

Data integrity is achieved on each packet by a CRC (Cyclic Redundancy Check) that enables a calculation to validate data transmitted in the packet. The CRC is located at the end of the packet and it corresponds to all bits in the packet (network information plus useful information).

In the network a packet is verified at each equipment entry to the network, so that every bad packet can be destroyed so that it cannot be used, in order to release the passband and to avoid unnecessarily overloading the switches.

2) Network Availability

The network is shared by several systems for communications. Therefore its availability has a non-negligible impact on the global availability.

This availability is increased by network redundancy, that consists of doubling up the network, with each subscriber having a connection to each of the two networks, and one of the two packets being selected on reception.

This network redundancy enables operation even if a switch or several links are defective.

3) Network Determinism

The network is a deterministic network. This means that any packet belonging to a virtual link for an allocated passband is sure of accessing the network and being transmitted to receiving equipment for a limited latency time (maximum packet transit time).

For a virtual link, the maximum latency calculation is given by the following formula:

$$\text{Latency time of a virtual link} = TA_E + TTE + (NS \times TTS) + TTR + TA_R$$

Where
- TTE: crossing time through the communication stack in transmission, corresponding to the time necessary to form packets in the communication services. This time is identical for all virtual links and is dependent on the hardware supporting the application.
- $TA_E$: transmission access time. The allocated passband is given in the form of a maximum passband and a minimum time between two consecutive packets (inter-packet time IPT). Since packets are sent in a virtual link asynchronously with regard to the application, if a packet has just been sent, it will be necessary to wait for a time IPT before accessing the network: thus $TA_E \leq IPT$ in all cases.
- NS: number of switches through which the virtual link passes,
- TTS: maximum time for a packet to pass through a switch,
- TTR: crossing time in reception through the communication stack, corresponding to the time TTE but in reception. This time includes the packet reception time by the services. It is identical for all virtual links, and it depends on the hardware supporting the application.
- $TA_R$: access time in reception. When a subscriber receives a packet, it is made available to the application through a "mail box". As a maximum, $TA_R = IPT$.

The times $TA_E$ and $TA_R$ are a result of the asynchronism between the applications and the network in transmission and reception.

A first estimate will give the following maximum values for a packet transfer time, independently of the virtual links:

TTE=0.5 ms
TTR=0.5 ms
TTS=1 ms.

Figure 11:
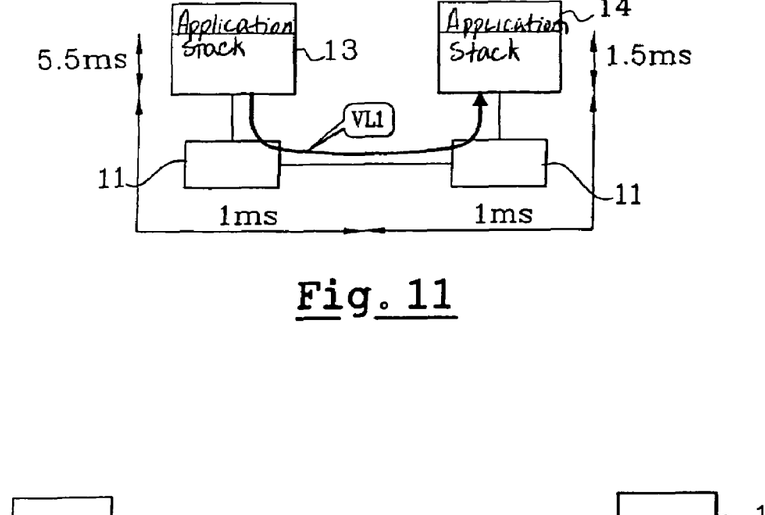
FIG. 11 illustrates an example of a transfer time for a virtual link VL1 according to the invention.

In the example illustrated in FIG. 11, in which the references in FIG. 2 are repeated, we have:

For the virtual link VL1 from equipment 13 to equipment 14 through two switches 11, if the time IPT=5 ms and the read interval=1 ms, we have:

$TA_E$=5 ms
NS=2
$TA_R$=1 ms
Latency time for a virtual link=9 ms.

4) End to End Routing of Data

The network according to the invention creates a single end to end route using virtual links, for each packet.

At each subscriber, each packet is assigned on transmission to a virtual link predefined by configuration. This packet has an addressing part that contains the identification of the virtual link. This identification is used for routing in the network.

In the routing of a packet, a service verifies if a packet is authorized to pass through each switch at which the packet arrives. Similarly, on reception, a service checks if the packet belongs to a virtual link authorized in reception. If not, the packet is destroyed.

Figure 12:
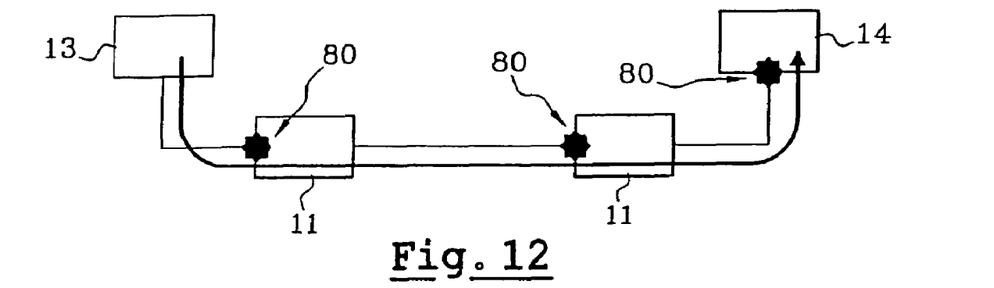
FIG. 12 illustrates an example verification of the packet in the virtual link VL1 in FIG. 11 according to the invention.

FIG. 12 illustrates an example verification of a packet in the virtual link VL1 in FIG. 10. This check takes place at points 80.

Example Embodiment of the Network According to the Invention in Avionics

In this example embodiment, several characteristics of the network according to the invention have been specified, in order to simplify and standardize the use of this network in avionics.

Characteristics of Virtual Links

1) Number of Virtual Links

Three subscriber classes are defined, depending on the number of virtual links in transmission and reception:
large consumer subscriber,
medium consumer subscriber,
small consumer subscriber.

This type of distribution is given in table 1 at the end of the description.

2) Passband in Virtual Links

Each virtual link has an allocated passband that is given by the minimum inter-packet time (IPT) and the packet size. The IPT is given by the following formula:

$IPT = 1 \text{ ms} \times 2^k$ where $K$ is an integer from 0 to 7;

which gives either 1 ms, 2 ms, 4 ms, 8 ms, 16 ms, 32 ms, 64 ms, or 128 ms.

By definition, four maximum packet sizes have been defined for each virtual link, namely 16 bytes, 98 bytes, 226 bytes and 482 bytes. This size only indicates useful data for the packet, used by applications directly. Network information data are also taken into account for calculation of the passband.

In table 2 at the end of the description, the effective passbands on the network for a virtual link are given for each packet size (useful load) and for each IPT time.

The required transmission passband for equipment on aircraft is low (<400 kbits/s). Thus, an upper bound in transmission is given which is summarized by the rule that the sum of passbands of the virtual links VL in transmission must be less than 5 Mbits/s. Thus, in transmission we can have:
a subscriber with ten 16-byte virtual links at 2 ms (which gives 3.36 Mbits/s), or
a subscriber with five 16-byte virtual links at 2 ms and ten 226-bytes virtual links at 16 ms and one 226-byte virtual link at 4 ms (which gives 4.778 Mbits/s).

In order to allocate a passband to a virtual link, a real need has to be identified in terms of data transmission frequency and volume.

Margins on the passband are given in two ways, either by duplication of the virtual link, or by an effective margin on the passband of the virtual link. In the latter case, it is possible to:
allocate a useful size larger than necessary,
allocate a shorter time IPT, so that the packet transmission frequency can be increased, for example the number of packets per second can be doubled if the time IPT changes from 16 ms to 8 ms,
a combination of the useful size and the time IPT.

3) Virtual Links Mode

Three transfer modes have been defined above, namely "sampling", "queuing", and "file transfer". In order to facilitate the definitions in the virtual links, each virtual link is used either in "sampling" mode or in "queuing" mode or in "file transfer" mode.

4) Filtering

The possibility of filtering in a virtual link enables some equipment to avoid an excessive number of virtual links in transmission and in reception (if the same transmitter). This means can be used to group several virtual links into a single link and to define "virtual sub-links", the packets being selected by network information contained in the packet. Filtering gives better flexibility on the use of communication "pipes" and enables optimisation of their use.

Structure and Format of the Useful Load

The term "structure" specifies the arrangement of the useful load (data transmitted and received by applications) in the packet.

The term "format" specifies the type of data (integer, binary, etc.).

The Ethernet standard does not impose the packet structure and the data format (unlike the ARINC 429 standard); however, the following rules are respected in the example considered.

Figure 13:
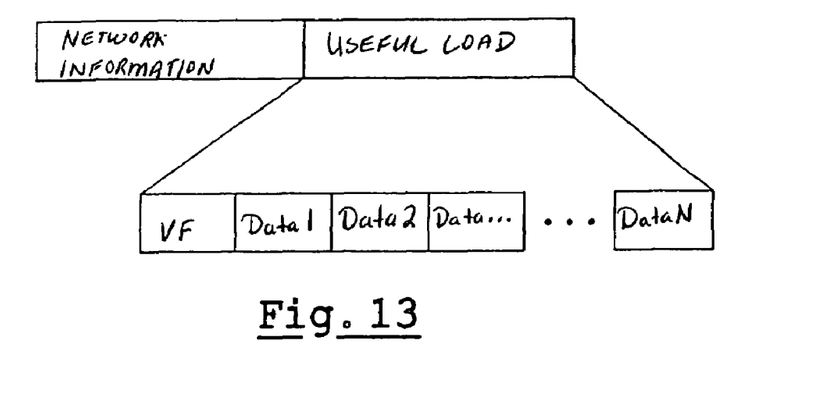
FIG. 13 illustrates the decomposition of the useful load of a packet in an example embodiment of the network according to the invention.

As illustrated in FIG. 13, the useful load comprises:
the functional validity (VF) valid for all data in the packet,
the data themselves, coded according to a standard format,
the arrangement of the data themselves shall be defined by common agreement between the transmitter and the addressees.

1) Functional Validity

The transmitter calculates the functional validity, and the receiver or receivers use it to determine the degree of confidence to be assigned to the transmitted packet. The functional validity is coded in the first four bytes of the packet.

The functional validity is the equivalent of "SSMs" used on the ARINC 429 aeronautical standard. However, there are some major differences:

This functional validity is purely functional, in other words it only reflects the state of data determined by the transmitting application, and not the state of resources that support it.

The functional validity may be equal to one of the following values:

NO: "Normal Operation"
NCD: "No Computed Data"
FTF: "Functional Test"

The validity of the resources due to distanciation between application and resource cannot be generated by the functional validity.

2) Data Format

Data are coded in a predefined format, in order to standardize exchanges. This format is as similar as possible to the "computer" format manipulated by compilers and microprocessors, to minimize format transformations to be made by applications.

The selected formats are defined in the coding rule illustrated in table 3 at the end of the description.

3) Data Grouping

The Ethernet protocol is particularly efficient when transmitted information is relatively long. Therefore, it is very advantageous to group data to that they can be sent all at once to facilitate coherence and integrity.

The data grouping criteria may be as follows:
same transfer mode
same refreshment period
functional affinity
same management of functional validity.

Network Design and Sizing Procedure

It is essential to define the subscriber hardware and software architecture, at least from the communication point of view, before carrying out a network design and sizing procedure.

This involves a system and network architecture design phase that must clearly identify:
physically interfaced equipment on the bus, apart from redundancy,
transmission and reception subscriber applications seen by the network,
virtual links as entirely separate elements of the network architecture with its topology.

The systems must take account of tests and if necessary define specific virtual links for transferring data to test instrumentation means.

For each hardware equipment, the following are necessary:
its identification: module name or equipment name,
its position in the aircraft architecture.

The following are necessary for each subscriber application:
its identification: function name,
its description: a comment,
its "mapping" on the hardware equipment in the aircraft architecture,
the identification of the logical interface.

Equipment, even equipment external to the aircraft, or a test installation, etc., may support several subscribers each with one or several logical interfaces to one or several sub-networks.

The following are necessary for each virtual link:
its identification: name of the virtual link,
the type of information transmitted in the form of a comment,
the name of the transmitting application,
the names of receiving applications,
its routing on hardware equipment in the aircraft architecture in the form of a list of switches passed through, as identified in the architecture,
the useful passband (bits/s),
the packet size: the packet size may be fixed or variable in a virtual link, and the maximum size must be given,
the time IPT,
justification of the passband, the packet size and the time IPT,
the usage mode: for "queuing" mode, it is possible to specify if the packet size is greater than 482 bytes,
the maximum latency.

The transmission system is responsible for defining virtual links. The transmission system must make sure that equipment in reception take account of virtual links.

Means Used

A database supports this part of the process and defines:
the hardware architecture of the system with all resources and wiring,
subscribers (components) and their "mapping" on the hardware architecture,
virtual links of the system and their routings.

Embodiment of a Communication Stack in an Equipment

This type of stack must enable every subscriber to interface with the communication network.

There are three possible approaches for integration of this function in the subscriber equipment:
an autonomous board satisfying all communication needs and capable of interfacing with the rest of the equipment simply through a bus,
a list of necessary components and the software that can be integrated into the target equipment,
a subscriber interoperability specification with its validation plan in order to check that the supplier's development is conform with the specified functional requirements.

TABLE 1

| Subscriber Class | Number of virtual links in transmission | Number of Virtual links in reception |
|---|---|---|
| Large consumer | 32 | 128 |
| Medium consumer | 16 | 64 |
| Small consumer | 8 | 32 |

TABLE 2

| Useful Byte (to) | Real passband on the network | | | | | | | |
|---|---|---|---|---|---|---|---|---|
| | 1 ms | 2 ms | 4 ms | 8 ms | 16 ms | 32 ms | 64 ms | 128 ms |
| 16 | 672 000 | 336 000 | 168 000 | 84 000 | 42 000 | 21 000 | 10 500 | 8280 |
| 98 | 1 328 000 | 664 000 | 332 000 | 166 000 | 83 000 | 41 500 | 20 750 | 10 375 |
| 226 | 2 352 000 | 1 176 000 | 588 000 | 294 000 | 147 000 | 73 5000 | 36 750 | 18 375 |

TABLE 2-continued

| Useful | Real passband on the network | | | | | | | |
|---|---|---|---|---|---|---|---|---|
| Byte (to) | 1 ms | 2 ms | 4 ms | 8 ms | 16 ms | 32 ms | 64 ms | 128 ms |
| 482 | 4 400 000 | 2 200 000 | 1 100000 | 550 000 | 275 000 | 137 500 | 68 750 | 34 375 |

16 ots = 64 Ots$_{\text{Ethernet frame}}$ − 18 Ots$_{\text{Ethernet header}}$ − 28 Ots$_{\text{UDP/IP header}}$ − 2 Ots$_{\text{Redundancy field}}$
98 ots = 146 Ots$_{\text{Ethernet frame}}$ − 18 Ots$_{\text{Ethernet header}}$ − 28 Ots$_{\text{UDP/IP}}$ − 2 Ots$_{\text{Redundancy field}}$
226 ots = 274 Ots$_{\text{Ethernet frame}}$ − 18 Ots$_{\text{Ethernet header}}$ − 28 Ots$_{\text{UDP/IP header}}$ − 2 Ots$_{\text{Redundancy field}}$
482 ots = 530 Ots$_{\text{Ethernet frame}}$ − 18 Ots$_{\text{Ethernet header}}$ − 28 Ots$_{\text{UDP/IP header}}$ − 2 Ots$_{\text{Redundancy field}}$

TABLE 3

| Type | Standard format |
|---|---|
| Character | Signed 8-bit ASCII character (Arinc 653) |
| Integer | Signed 32-bit integer (Arinc 653) |
| Unsigned integer | Unsigned 32-bit integer (Arinc 653) |
| Boolean | Unsigned 32-bit integer with info in LSB |
| Real | 32-bit floating point integer according to IEEE 303 |
| Propietary type | Format not managed by IOF's |

Obviously, numerous modifications and variations of the present invention are possible in light of the above teachings. It is therefore to be understood that within the scope of the appended claims, the present invention may be practiced otherwise than as specifically described herein.

The invention claimed is:

1. A switched full-duplex Ethernet communication network comprising:
at least one source subscriber equipment and at least one destination subscriber equipment connected to each other through at least one physical link through at least one switch and through at least one virtual link, which is a conceptual representation of a link from a source equipment to at least one destination equipment, wherein each source equipment that transmits Ethernet frames comprises:
a control to segregate between virtual links and to allocate a passband for each virtual link, the passband of a virtual link being eciual to: (packet size)/(minimum inter-packet time), the sum of passbands of the virtual links in transmission being less than about 5 Mbits/s; and
a control to multiplex the virtual links on the physical links output from the source equipment, each transmitted frame having a field that identifies the virtual link to which it belongs,
wherein each switch is configured to discard incoming packets if, for each incoming virtual link, one or more predetermined time constraints for said incoming packets are violated,
and wherein each destination equipment is configured to subscribe for an application in reception to at least one virtual link and to make the segregation between virtual links to said application for the duration of the application.

2. A network according to claim 1, wherein each destination equipment comprises a control to subscribe in reception to at least one virtual link and to make segregation between virtual links as far as an application.

3. A network according to claim 1, wherein each switch comprises a control to control an incoming passband for each virtual link.

4. A network according to claim 3, further comprising a static configuration table allowing each switch to know the virtual links that it has to switch and a number of authorized packets for a virtual link.

5. A network according to claim 4, wherein each switch comprises:
a control to configure each input port separately to indicate output ports to which each Ethernet frame must be directed as a function of the field identifier of the virtual link;
a control to monitor flow of Ethernet frames associated with each virtual link that passes through the switch;
a control to reformat the flow in each virtual link; and
a control to multiplex flows in virtual links on each output port.

6. A network according to claim 5, wherein each switch comprises the following in sequence:
an input port;
a flow controller;
a switching motor supporting multidestination transfers;
a flow controller;
a flow reformatting device;
a virtual link multiplexer; and
an output port.

7. A network according to claim 1, wherein the virtual link comprises:
a transfer direction, the virtual link being single directional;
a source equipment;
one or several destination equipment;
a fixed passband;
a guaranteed maximum time for transfer of packets from a source equipment to a destination equipment, regardless of the behaviour of the rest of the network, each virtual link having its own transfer time;
a fixed path on the network; and
an unique identifier.

8. A network according to claim 1, wherein network redundancy is achieved by doubling up the network.

* * * * *